United States Patent [19]

Pech et al.

[11] Patent Number: 5,406,767
[45] Date of Patent: Apr. 18, 1995

[54] LONGITUDINALLY DIVISIBLE CRANE BOOM SEGMENT

[75] Inventors: David J. Pech; Robert J. Walker, both of Manitowoc; Michael J. Wanek, Two Rivers, all of Wis.

[73] Assignee: The Manitowoc Company, Inc., Manitowoc, Wis.

[21] Appl. No.: 980,499

[22] Filed: Nov. 23, 1992

[51] Int. Cl.$^6$ .......................... E04H 12/00; F16B 2/00
[52] U.S. Cl. ........................................ 52/638; 52/721; 52/645; 52/646; 403/381; 403/43
[58] Field of Search ................... 52/637, 638 OR, 721, 52/645, 646, 648.1; 403/345, 346, 381, 43

[56] References Cited

U.S. PATENT DOCUMENTS

| | | | |
|---|---|---|---|
| 409,893 | 8/1889 | Wray | 403/381 |
| 1,167,155 | 1/1916 | Derby | 403/381 |
| 1,233,743 | 7/1917 | Arndt | 52/645 |
| 1,788,145 | 1/1931 | Bates . | |
| 2,221,067 | 11/1940 | Wilson | 52/117 |
| 3,029,913 | 4/1962 | Liesenfeld | 52/638 |
| 3,249,238 | 5/1966 | Hedeen | 52/650.2 |
| 3,796,018 | 3/1974 | Holmstrom . | |
| 3,877,192 | 4/1975 | Metailler . | |
| 4,019,298 | 4/1977 | Johnson | 403/381 |
| 4,253,579 | 3/1981 | Williams . | |
| 4,407,600 | 10/1983 | Thompson | 403/43 |
| 4,506,487 | 3/1985 | Hill | 52/690 |
| 5,244,300 | 9/1993 | Perreira et al. | 403/381 |

FOREIGN PATENT DOCUMENTS

| | | | |
|---|---|---|---|
| 1436649 | 3/1966 | France . | |
| 2058700 | 5/1971 | France . | |
| 2113922 | 6/1972 | France . | |
| 2184418 | 12/1973 | France . | |
| 2352202 | 12/1977 | France . | |
| 913347 | 6/1954 | Germany | 212/266 |
| 2846819 | 5/1979 | Germany . | |
| 693945 | 7/1953 | United Kingdom . | |

OTHER PUBLICATIONS

Mannesmann Demag product literature for a Model CC4800 crawler crane (date unknown).
Mannesmann Demag product literature for a Model CC8000 crawler crane (date unknown).
Mannesmann Demag product literature for a Model CC12000 crawler crane (date unknown).
Neil F. Lampson, Inc. product literature for a Transi-Lift crane (date unknown).
Three (3) photographs of chord and lacing connections for a Neil F. Lampson, Inc. Transi-Lift crane (Apr. 1992).
Manitowoc Ringer Concept brochure (1974).
Manitowoc product literature for a Model 4600 S-4 Ringer (1983).
Manitowoc brochure for a Model M1200R crane with a 750 metric ton rating (date unknown).
Manitowoc brochure for a Model M1200R crane with a 800 metric ton rating (date unknown).
Manitowoc brochure for a Model M1200R crane with a 1200 metric ton rating (date unknown).
European Search Report and Annex thereto listing and commenting on the above-listed reference (date: Apr. 25, 1994).

Primary Examiner—Carl D. Friedman
Assistant Examiner—Wynn Wood
Attorney, Agent, or Firm—Willian Brinks Hofer Gilson & Lione

[57] ABSTRACT

A longitudinally divisible crane boom segment includes a plurality of sections that are easily transportable. The sections each include at least one chord member, and a plurality of partial lacing elements. Each partial lacing element has a first end permanently attached to the at least one chord member and a second end connectable to one or more corresponding ends of plurality of partial lacing elements attached to a chord member of another section. Preferably the partial lacing elements are connected by dovetail connectors.

28 Claims, 7 Drawing Sheets

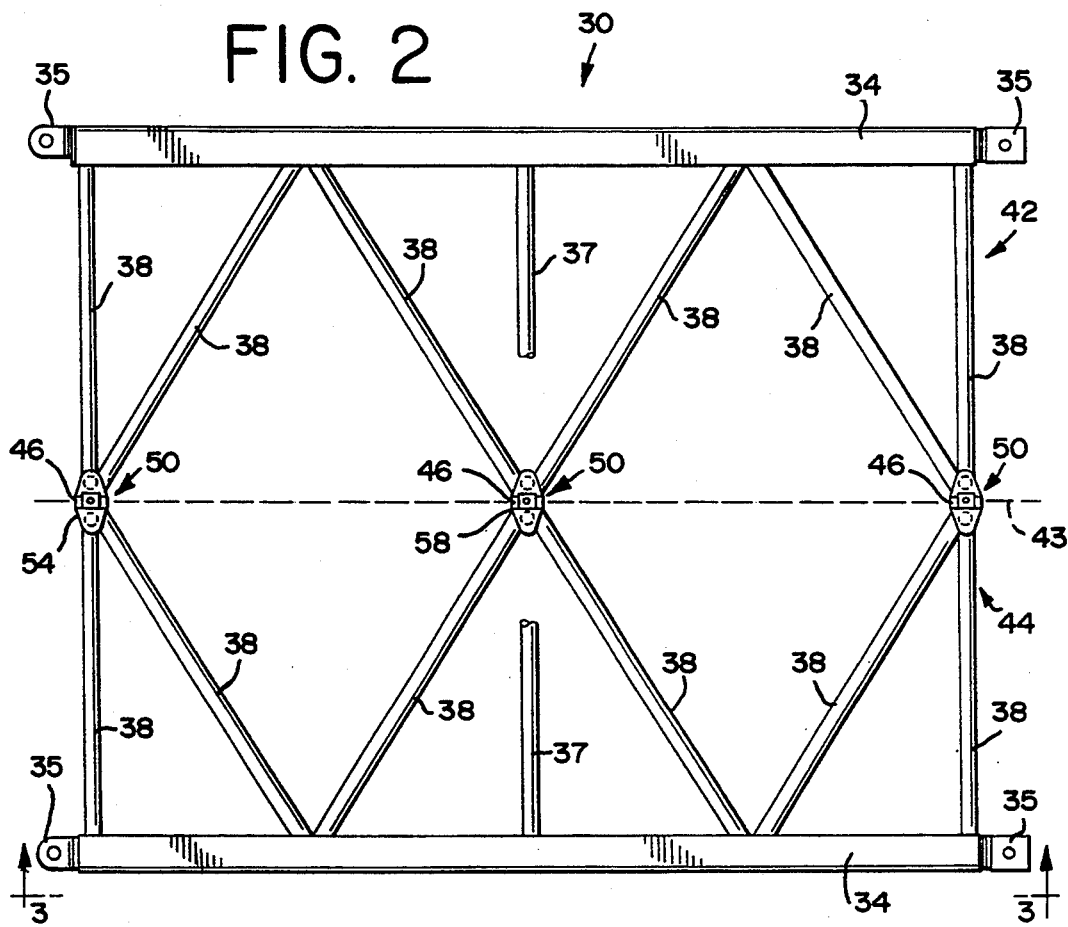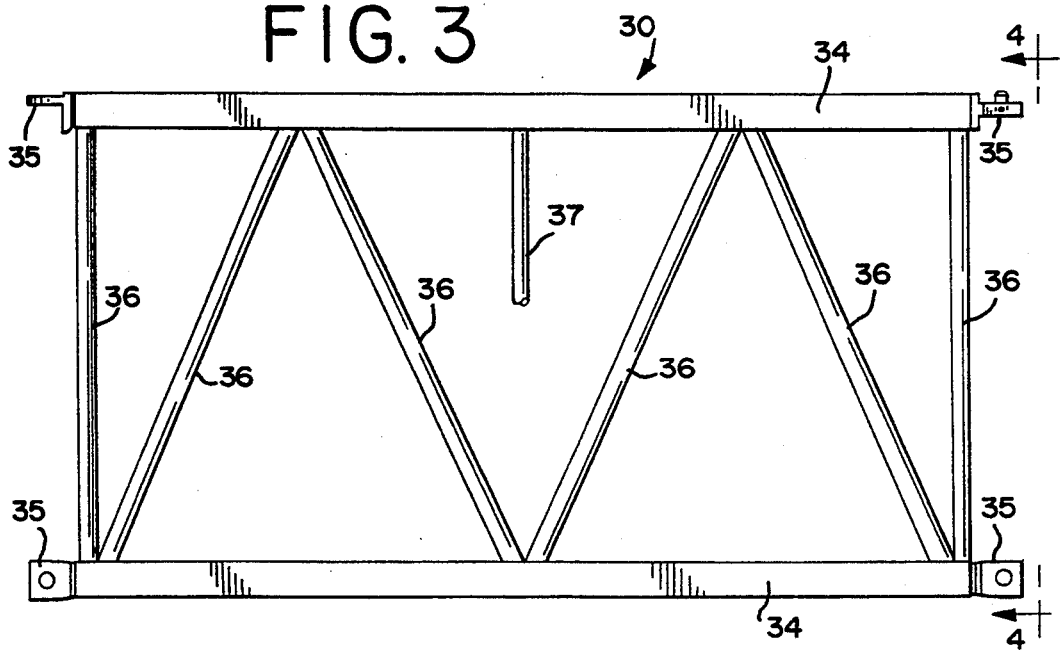

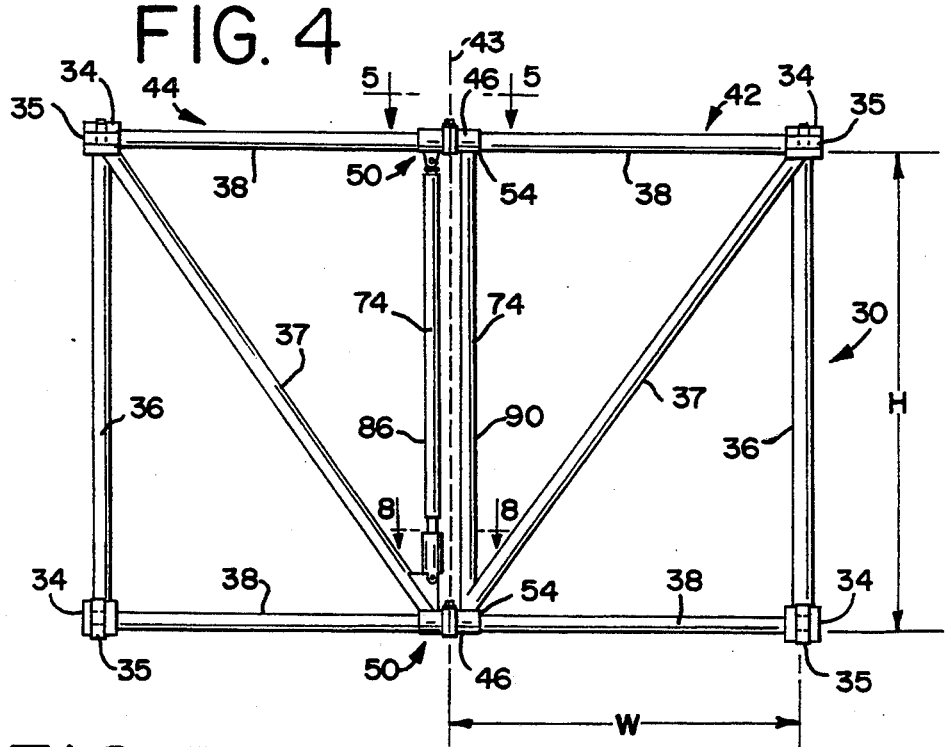
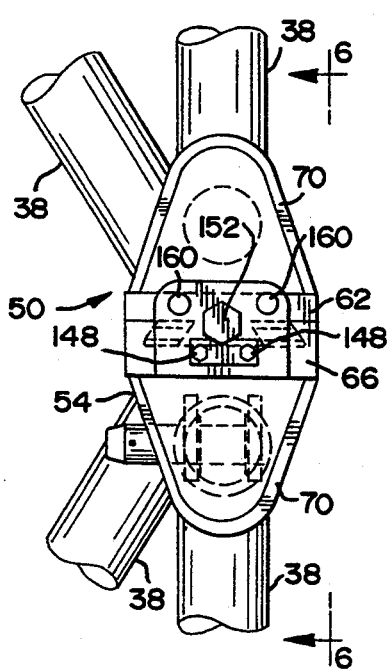
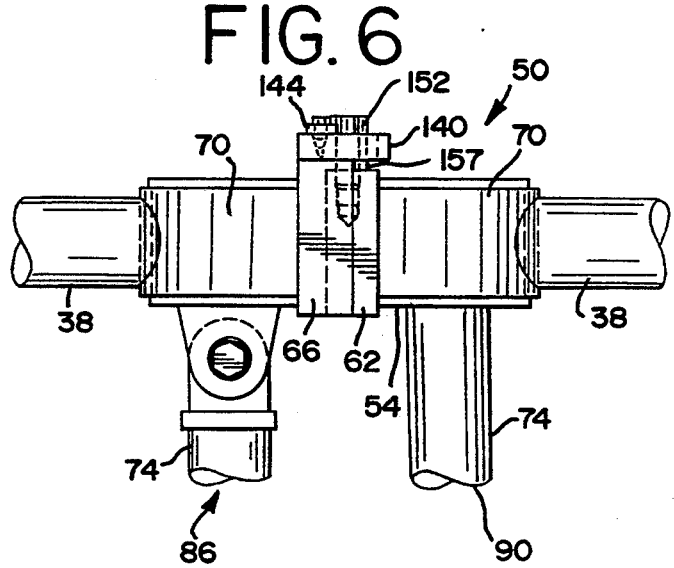

LONGITUDINALLY DIVISIBLE CRANE BOOM SEGMENT

BACKGROUND OF THE INVENTION

The present invention relates generally to the field of load-lifting cranes, and more particularly to crane boom segments for such cranes.

Depending upon the requirements of a lift, the length and column strength of a crane boom may vary. For example, crane boom length depends upon the distance between the crane and the object to be lifted, and upon the distance between the object and the height or location to where the object is to be moved. Additionally, the column strength required of a crane boom increases proportionately with the weight of the load to be lifted.

Since the length required of a crane boom will often vary from lift to lift, crane booms are typically comprised of individual boom segments connected end-to-end. The boom segments are usually formed in specific lengths, e.g., 10, 25 and 50 ft. Thus, the length of a crane boom can be tailored to fit each individual lift.

In contrast to the readily changed length of a crane boom, the column strength of a crane boom is not changed to fit a particular lift. Rather, crane manufacturers typically offer a variety of crane booms with differing column strengths. The load requirements of a lift dictates which variety of crane boom is required.

As previously discussed, the greater the load to be lifted, the greater the column strength required of the crane boom. The column strength of a boom is a well-known function of the cross-sectional area of the material used in its chord members, the strength of that material and the distance those chord members are from the center-line of the column. One method of increasing the column strength of a boom without increasing the amount of material used in the chords (and hence the weight of the boom) is to space the chords further from the center-line of the boom. This, however, increases the overall width and/or height of the boom section. Transportability problems arise with crane boom sections of large dimension. If any of the dimensions is too large, the crane boom segments cannot be transported along highways, railways and the like due to size restrictions. Thus, difficulties arise in moving crane booms of large dimensions to job sites. Because of these restrictions, it was previously thought that a crane boom 10 feet 10 inches wide and 9 feet 7 inches high was about as large of a boom as would be acceptable for highway transport.

Three approaches have been used to overcome this problem, all of which have distinct disadvantages. The first approach, practiced by Neil F. Lampson, Inc., consists of transporting the individual parts of each crane boom segment to the specific jobsite and constructing the crane boom segments on-site. Specifically, Lampson positions the chord members of the crane boom segments on-site and then bolts the lacing members for each crane boom segment to the chord members thereof. After the crane boom segments are constructed, they are connected end-to-end to form the crane boom. This approach requires time-consuming and labor-intensive construction.

The second approach, believed to be used by Mannesmann Demag Baumaschinen, is to utilize crane boom segments of a sufficiently small dimension to allow them to be transportable, but to form the chord members with very thick walls. While the small overall dimension allows the crane boom segments to be transported easily, the additional weight causes the crane boom to be heavier and thus a less efficient column member.

The last approach is to transport a sufficient number of crane boom segments to the jobsite such that two or more crane booms may be formed. The separate crane booms are then used side-by-side, in conjunction with one another, to complete the required task. This approach has the disadvantage of requiring the assembly of multiple crane booms, and further of adapting the crane booms so that they can be used as one unit instead of separate units.

The present invention solves the transportability problem of crane boom segments of large dimension without the undesirable use of larger and heavier chord members or the need for difficult and time-consuming construction of individual crane boom segments or crane booms on the job site.

SUMMARY OF THE INVENTION

A first aspect of the present invention is a crane boom segment longitudinally divisible into a plurality of sections that are transportable, the sections each including at least one chord member and a plurality of partial lacing elements, each partial lacing element having a first end permanently attached to the chord member and a second end connectable to one or more corresponding ends of a plurality of partial lacing elements attached to a chord member of another section.

A second aspect of the present invention is a crane boom segment longitudinally divisible into a plurality of sections that are easily transportable, the sections each including at least two chord members, a plurality of lacing elements permanently attached to and spacing the two chord members, a plurality of partial lacing elements, each partial lacing element having a first end permanently attached to one of the chord members and a second end connectable to one or more of the corresponding ends of a plurality of partial lacing elements attached to a chord member of the other section, and at least one of the sections having at least one adjustable-length spacing member disposed between partial lacing elements on opposite sides of the crane boom segment to facilitate the alignment of those partial lacing elements with partial lacing elements of the other section.

A third aspect of the present invention is a longitudinally divisible crane boom segment comprising a plurality of sections having mating dovetail connector elements positioned thereon, the mating dovetail connector elements operative to connect the plurality of sections to form the crane boom segment.

A fourth aspect of the present invention is a longitudinally divisible crane boom segment comprising a plurality of sections, at least one of the sections having at least one adjustable-length spacing member, the at least one adjustable-length spacing member operative to facilitate the alignment of the plurality of sections so that the plurality of sections can be connected to form the crane boom segment.

A fifth aspect of the present invention is a longitudinally divisible crane boom segment including a plurality of sections each including at least three chord members and a plurality of lacing elements connected between the at least three chord members such that each section constitutes a self-supporting column, and a plurality of mating connector elements located on each of the plurality of section elements, the plurality of mating connector elements operative to mate with mating connector elements located on another section, whereby the plurality of sections are connected to form the crane boom segment made up of connected self-supporting columns.

A sixth aspect of the present invention is a method of assembling a longitudinally divisible crane boom segment by providing a plurality of boom segment sections each comprising a plurality of dovetail connector elements positioned thereon; and connecting the dovetail connector elements of adjacent boom segment sections to form the crane boom segment.

A seventh aspect of the present invention is a method of forming a longitudinally divisible crane boom segment by providing a plurality of sections comprising at least one chord member with a plurality of partial lacing elements permanently attached at a first end to the chord member and having a mating connector element on the other end of the partial lacing elements for mating with connector elements on partial lacing elements attached to a chord member of another one of said plurality of sections; and connecting the mating connector elements of adjacent sections to form the crane boom segment.

An eighth aspect of the present invention is a connector for connecting sections of a crane boom including a male and a female dovetail connector element, each having a tapered dovetail, the dovetail tapers of the male and the female connector elements engaging to form a force resistant joint.

The crane boom segment of the present invention has the advantage of being easily assembled and disassembled on the job site. Additionally, the boom segment sections are easily transported via highway, railway and the like from job site to job site. Furthermore, since the crane boom segment can be easily disassembled and transported, there is no need for the crane boom segment to include large, heavy chord members to enable the crane boom to support extremely heavy loads.

The invention itself, together with further advantages, will best be understood by reference to the following detailed description, taken in conjunction with the accompanying drawings.

BRIEF DESCRIPTION OF THE DRAWINGS

FIG. 2 is a plan view taken along line 2—2 of a segment of the crane boom shown in FIG. 1;

FIG. 3 is a side view taken along line 3—3 of FIG. 2.

FIG. 4 is an end view taken along line 4—4 of FIG. 3.

FIG. 5 is an enlarged partial top view of the K-pattern lacing connection taken along line 5—5 of FIG. 4.

FIG. 6 is a side view taken along the line 6—6 of FIG. 5;

DETAILED DESCRIPTION OF THE DRAWINGS AND PRESENTLY PREFERRED EMBODIMENTS OF THE INVENTION

Figure 1:
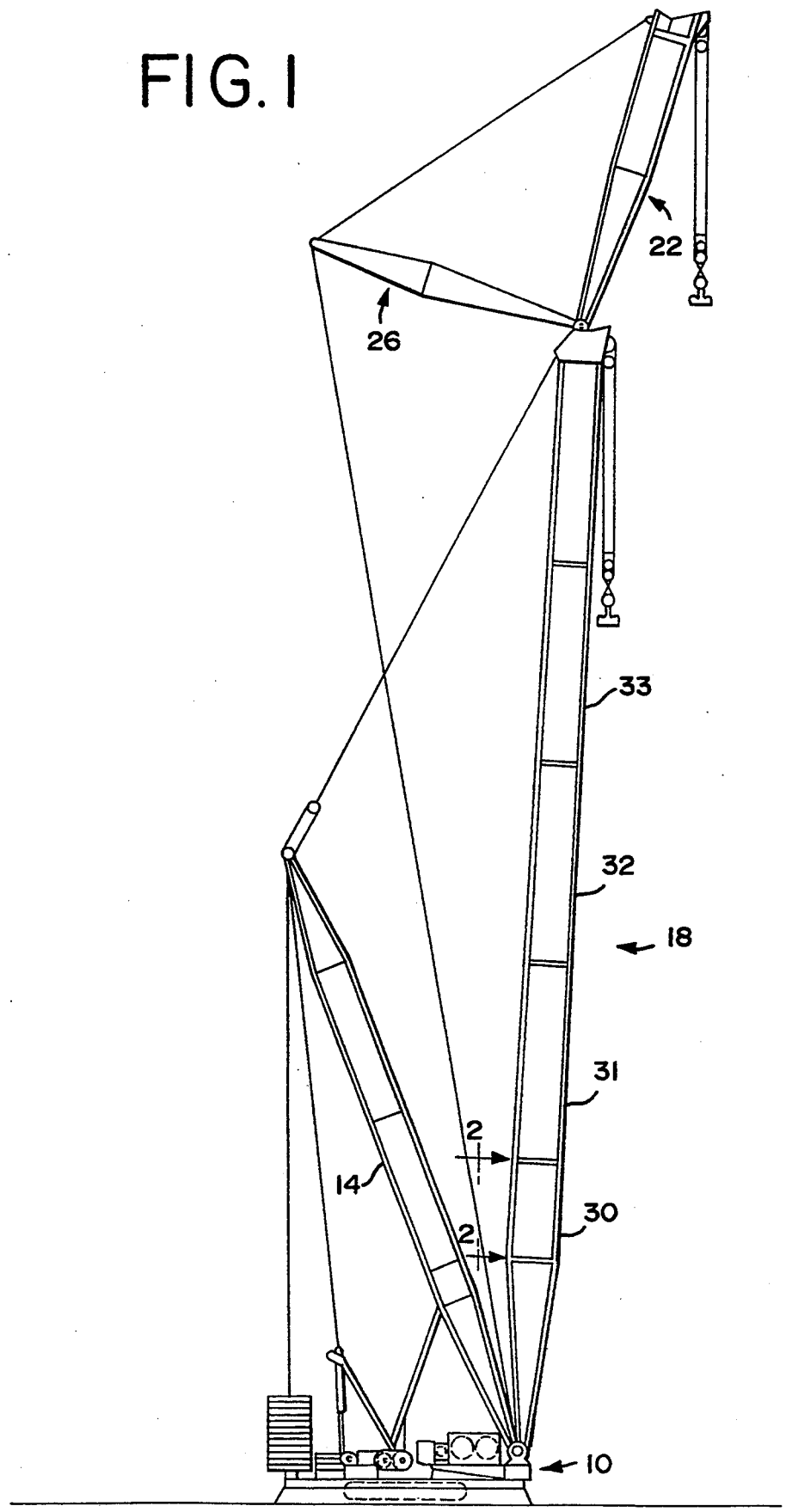
FIG. 1 is an elevational view of a crane showing a main crane boom and a jib connected to the top thereof.

As shown in FIG. 1, a crane 10 includes a mast 14, a boom 18, a jib 22, and a strut 26. Each of the mast 14, boom 18, jib 22 and strut 26 is comprised of individual segments connected end-to-end to form the respective crane member. While the crane boom segments 30, 31, 32, 33 etc. of the present invention are generally described in relation to crane booms 18, it should be understood that the present invention also applies to other similar types of crane members, including the mast 14, the jib 22 and the strut 26 shown in FIG. 1.

The crane boom segment 30, best seen in FIGS. 2–4, preferably comprises chord members 34, end connectors 35, permanent lacing elements 36, and partial lacing elements 38, some of which are diagonal partial lacing elements 37. The chord members 34 are the main load bearing members of a crane boom 18, whereas the lacing elements 36 and partial lacing elements 37 and 38 add structural rigidity to the crane boom 18 and operate to maintain the chord members 34 in their correct spaced relationship. The end connectors 35 are preferably shaped to allow quick connection of the boom segments 30, 31, 32, etc., as disclosed in U.S. patent application Ser. No. 07/736,029, now U.S. Pat. No. 5,199,586, issued Apr. 6, 1993, the contents of which are hereby incorporated by reference.

As best shown in FIG. 4, the chord members 34 are positioned at the corners of the rectangular cross-sectioned crane boom segment 30. The lacing elements 36 are fixed at both ends to chord members. The partial lacing elements 37 and 38 are connected at one end to one of the chords 34 and at their other end to other partial lacing elements 37 and 38 by mating connectors 46. The partial lacing elements 37 are severed in FIGS. 2 and 3 because they are diagonal and do not reside in the plane of the lacing elements 36 and the partial lacing elements 38 shown therein.

In the event that the height and width of a crane boom segment 30 is of such size that the crane boom segment 30 cannot be transported as one unit, the present invention allows the crane boom segment 30 to be easily disassembled into a plurality of boom segment sections and transported to the jobsite for reassembly. In the preferred embodiment of the present invention, as best shown in FIGS. 2 and 4, the crane boom segment 30 is longitudinally divisible into two boom segment sections 42 and 44 along dotted line 43. However, the present invention may be employed to longitudinally divide the crane boom segment 30 into any suitable number of boom segment sections.

In the preferred embodiment, the mating connectors 46 comprise tapered dovetail connectors 50 made with two mating elements, as fully described below. Alternately, however, the mating connectors 46 may comprise regular (untapered) dovetail connectors or any other suitable types of connectors, including bolted flanges (not shown).

In the following paragraphs, only two dovetail connectors 50 are described. However, it must be understood that the crane boom segment 30 of the present invention, as shown in FIGS. 2 and 4, includes a plurality of dovetail connectors 50 located along parallel upper and lower planes. Specifically, FIG. 2 shows three dovetail connectors 50 along the top horizontal plane of the boom segment 30 and FIG. 4, an end view of the boom segment 30 shown in FIG. 2, shows top and bottom dovetail connectors 50. Thus, the preferred embodiment of a 25 foot crane boom segment 30 includes a total of six dovetail connectors 50. Obviously, when the crane boom segment 30 is longer or shorter, additional or fewer dovetail connectors 50 are needed.

The dovetail connectors 50 of the preferred embodiment are located on the ends of the partial lacing elements 37 and 38. The partial lacing elements 37 and 38 of both boom segment sections 42 and 44 connect to form the crane boom segment 30. As shown in FIG. 2, two types of connection patterns are formed in the preferred embodiment—the K-pattern connection 54 and the X-pattern connection 58. While the geometry of the lacing elements 38 are different for each type of connection pattern, the dovetail connector 50 is identical. In alternate embodiments of the present invention, connection patterns other than the K-pattern connections 54 and the X-pattern connections 58 may be used.

An enlarged view of the K-pattern connection 54 is shown in FIG. 5. The K-pattern connection 54 includes a dovetail connector 50 having two mating elements, a male member 62 and a female member 66. The connector 50 also includes plate members 70 connected to the backs of the male member 62 and the female member 66. The partial lacing elements 38 are attached to the plate members 70. Preferably, the plate members 70 are welded to the male and female members 62, 66 of the dovetail connector 50 and the partial lacing elements 38 are welded to the plate members 70. Alternately, however, the lacing elements 38 may be connected to the dovetail connectors 50 in any suitable manner. The plate members 70 are preferably welded to the male and female members 62, 66 of the dovetail connector 50 prior to machining the dovetail connector 50. This avoids distortion of the male and female members 62, 66 that could occur if they were machined first and then welded to plate members 70.

Figure 7:
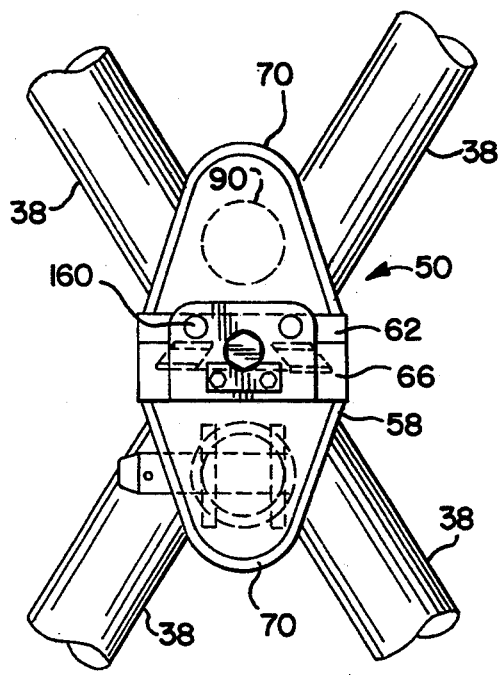
FIG. 7 is an enlarged partial top view of the X-pattern lacing connection shown in the center of FIG. 2.

FIG. 7 shows an enlarged view of an X-pattern connection 58. The X-pattern connection 58 is identical to the K-pattern connection 54 described directly above, except that the location of the lacing elements 38 along the plate members 70 are different.

A side view of the K-pattern connection 54 is shown in FIG. 6. This view also corresponds to that of the dovetail connector 50 shown at the top of FIG. 4. As shown in the end view of the crane boom segment 30 in FIG. 4, both segment sections 42 and 44 comprise a vertical lacing element 74 positioned at the interface between the two sections 42 and 44. The vertical lacing elements 74 generally extend between dovetail connectors 50 at the top and bottom of the boom segment. In the preferred embodiment, the vertical lacing elements 74 are directly connected to the top dovetail connector 50, but tie into diagonal lacing elements 37 rather than directly connect to the bottom dovetail connector 50 itself (See FIGS. 4 and 9).

Figure 10:
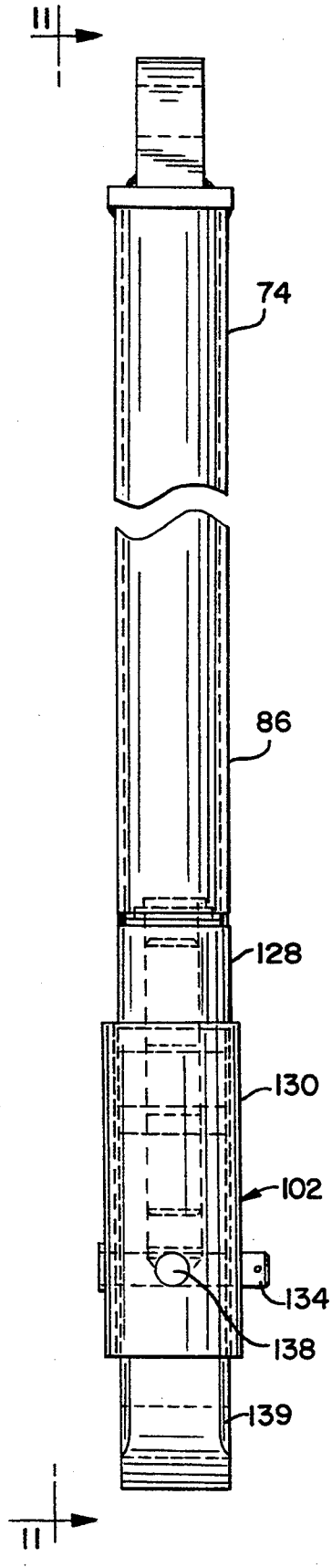
FIG. 10 is an enlarged, partially elevational view of the adjustable-length spacing member shown in FIG. 4.
Figure 11:
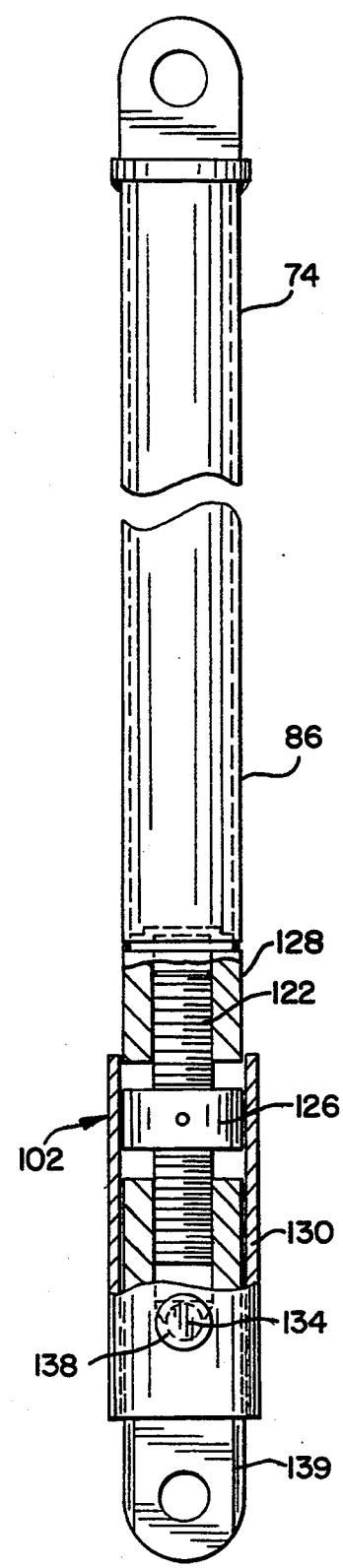
FIG. 11 is a partial cut-away view of the adjustable-length spacing member taken along line 11—11 of FIG. 10.

In the preferred embodiment of the present invention, and as shown in FIG. 4, one of the two adjacent vertical lacing elements 74 is an adjustable-length member 86. Thus, in FIG. 4 there is shown both an adjustable-length spacing member 86 and a rigid lacing element 90. The rigid lacing element 90 rigidities the structure of the fight segment section 42 in FIG. 4, thereby preventing the lacing elements 38 of the section 42 from being moved. The left segment section 44 includes the adjustable-length spacing member 86, which operates to allow the lacing elements 38 on opposite sides of the section 44 to be moved relative to one another. This movement is desirable because of the difficulty of constructing the large sections 42 and 44 with a tolerance so small that the dovetail connectors 50 would always line up with one another. The adjustable-length spacing member 86 allows the lacing elements 38 of the left section 44 to be aligned with the lacing elements 38 of the fight section 42 when the sections 42 and 44 are connected to form the crane boom segment 30. Preferably, as best shown in FIGS. 10 and 11, the adjustable-length spacing member 86 is adjusted by means of a turnbuckle assembly 102, which will be fully described below. However, the adjustable-length spacing member 86 may include any suitable adjustment means.

It is anticipated that the sections 42 and 44 of each crane boom segment 30 will be used together exclusively, i.e., that sections 42 (or 44) of different boom segments 30 will not be interchanged. If such is the case, the adjustable-length spacing member 86 will need only be adjusted once to align the lacing elements 38 of mating sections 42 and 44. After the one adjustment, the lacing elements 38 of the mating sections 42 will remain aligned with the lacing elements 38 of section 44 throughout the numerous assemblings and disassemblings of the crane boom segment 30. If, however, for whatever reason segment sections 42 or 44 are interchanged or replaced, the adjustable-length spacing member 86 will allow the lacing elements 38 of mating sections 42 and 44 to be easily and quickly aligned.

While it is preferred that only one mating section 42 or 44 has an adjustable-length spacing member 86, in an alternate embodiment both mating sections 42 and 44 may include an adjustable-length spacing member 86, or other adjustable-length members may be used as lacing elements in the construction of sections 42 and 44. While the distance between lacing elements 38 may be adjusted any suitable distance by the adjustable-length spacing member 86, preferably the adjustments are limited to small tolerance distances, i.e., plus or minus 0.25 inches.

As best shown in FIG. 6, the top end of the adjustable-length spacing member 86 is pivotally connected to the top dovetail connector 50. The pivotable connection allows the top lacing element 38 to be angularly displaced without inducing the mechanical stress that would develop if the adjustable-length spacing member 86 were welded or similarly attached to the top dovetail connector 50.

Figure 8:
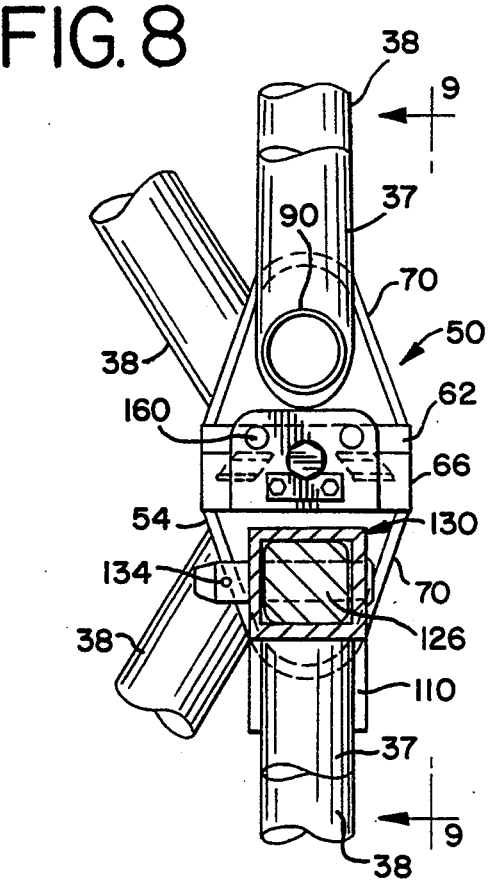
FIG. 8 is an enlarged sectional view of the K-pattern lacing connection taken along line 8—8 of FIG. 4.
Figure 9:
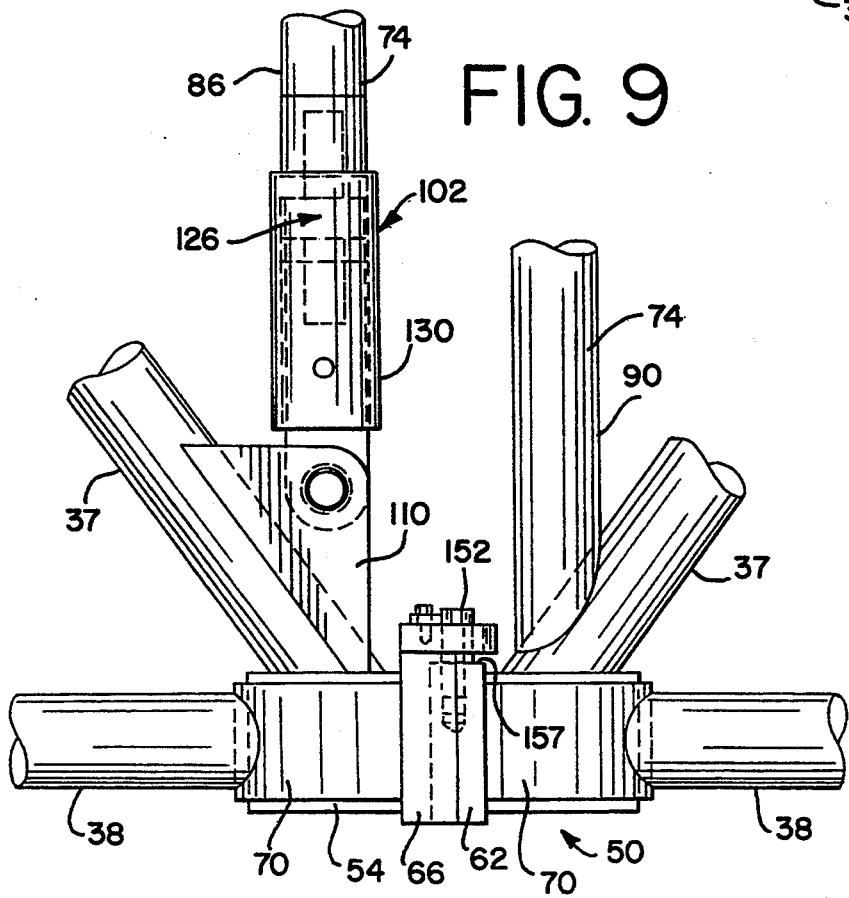
FIG. 9 is a side view of the K-pattern lacing connection taken along line 9—9 of FIG. 8.

FIGS. 8 and 9 show, respectively, a top view and a side view of the bottom dovetail connector 50 of FIG. 4. As best shown in FIG. 9, the adjustable-length spacing member 86 is pivotally connected to a flange 110 attached to a diagonal lacing element 37. The rigid lacing element 90 is attached to a second diagonal lacing element 37 and to the top dovetail connector 50 (See FIG. 4). The rigid lacing element 90 may be attached in any suitable manner. Preferably, however, the rigid lacing element 90 is welded to both the second diagonal lacing element 37 and the top dovetail connector 50.

The adjustable-length spacing member 86 and the turnbuckle assembly 102 therefor are shown in FIGS. 10 and 11. The turnbuckle assembly 102 comprises a right- and left-handed threaded rod 122, a turnbuckle 126, a turnbuckle sleeve 130, and a pin 134. The rod 122 is attached to the spacing member 86 by means of a threaded plug 128 welded to the inside of the spacing member 86. The turnbuckle sleeve 130 and the lower end 139 of adjustable-length member 86 have a hole 138 therethrough to accept the pin 134. Preferably sleeve 130 has two holes 138 perpendicular to each other so that holes 138 allow the turnbuckle assembly 102 to be adjusted and pinned in 90° increments. Alternately, the turnbuckle assembly 102 may have additional holes therethrough to allow for more precise adjustment.

To adjust the length of member 86, the pin 134 is removed. Sleeve 130 may now be moved up to disengage the square portion of the lower end 139 and to rotate the turnbuckle 126. As the turnbuckle 126 is rotated, the threaded rod 122 draws together (or forces apart) the two ends of adjustable-length spacing member 86. When the desired length is achieved, sleeve 130 is moved back down over the square portion of lower end 139 and is pinned. The inside of sleeve 130 is also square so that it will engage turnbuckle 126 to prevent it from turning once sleeve 130 is pinned. The pin 134 prevents the sleeve 130 from sliding during crane use.

Figure 12:
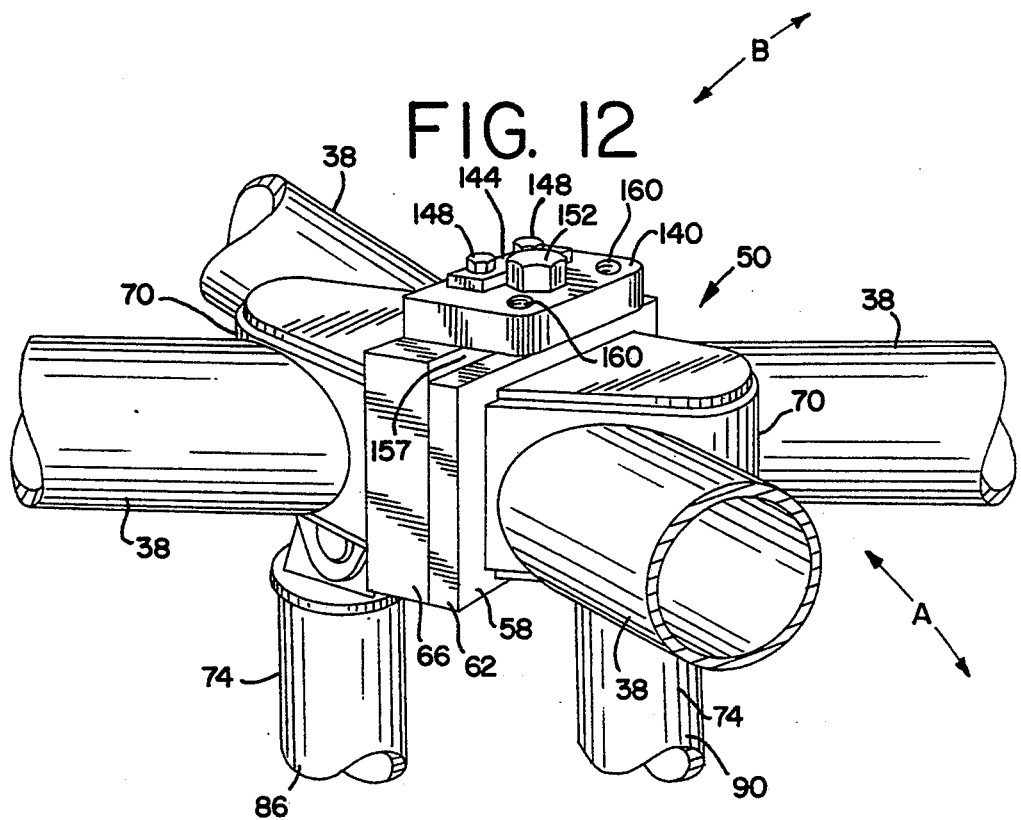
FIG. 12 is a perspective view of the X-pattern lacing connection shown in FIGS. 2 and 7.
Figure 13:
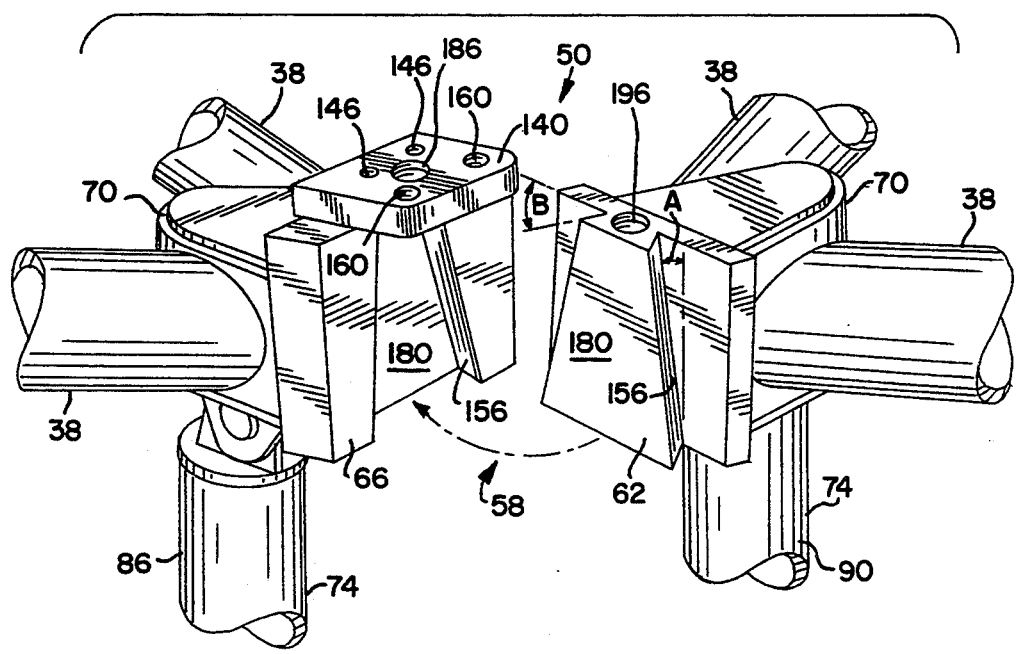
FIG. 13 is an exploded view of the X-pattern lacing connection of FIG. 12 showing the features of the dovetail connection.

Perspective views of the X-pattern connection 58 are shown in FIGS. 12 and 13. As previously stated, the dovetail connectors 50 for both the X-pattern 58 and K-pattern 54 connections have identical elements and differ only in the geometry of the connecting lacing elements 38. The dovetail connector 50 comprises a male dovetail member 62, a female dovetail member 66, plate members 70 attached to the back of each of the male member 62 and the female member 66, a locking plate 140, a locking bolt 152, a keeper plate 144, two keeper bolt holes 146 (seen in FIG. 13), two keeper bolts 148, and two tapped jacking holes 160.

Figure 14:
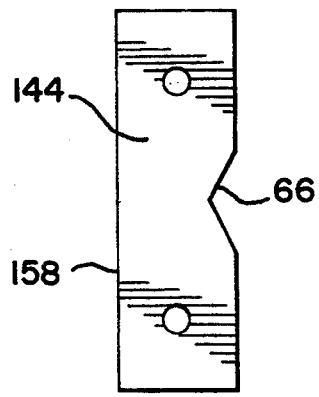
FIG. 14 is a top plan view of the keeper plate shown in FIG. 12.

The dovetail connector 50 is joined by positioning the male dovetail member 62 at a location below that of the female dovetail member 66, and then moving the male member 62 upwardly such that the members 62, 66 interface along the dovetail taper 156. After the male member 62 is moved to a position where it is slightly below the bottom of the locking plate 140, the locking bolt 152 is inserted and turned to draw the dovetail members 62, 66 together. Preferably, the dovetail connectors are tapered and a small gap 157 remains between the top of male dovetail member 62 and locking plate 140 so that wear in the dovetail member over time will not prevent the locking bolt 152 from drawing the dovetail members 62, 66 tightly together. Subsequently, the keeper plate 144 is bolted to the dovetail connector 50 via keeper bolts 148. The keeper plate 144 (shown in FIG. 14) includes a V-shaped recess 166 which fits around one corner of the hex-head of the locking bolt 152. The recess 166 of the keeper plate 144 functions to prevent the locking bolt 152 from unscrewing and, thereby, loosening the dovetail connector 50. Alternatively, if the keeper plate 144 is turned over so that back side 158 is facing the head of locking bolt 152, the holes for keeper bolts 148 are spaced such that the back side 158 will contact a flat side of the hex-head of keeper bolt 152. In this fashion, the keeper bolt 152 can be secured at each 30° rotational increment.

In order for the mating segments sections 42 and 44 to be easily connected, all of the dovetail members on one section 42 must be tapered in the same direction and all of the dovetail members on the mating section 44 must be tapered in the opposite direction.

When the dovetail connector 50 is to be separated, the jacking holes 160 may be used to quickly separate the dovetail members 62, 66. A jacking bolt (not shown) or a locking bolt 152 is inserted into one or both of the jacking holes 160 and turned until the dovetail members 62, 66 are forced apart.

As stated above, while other suitable types of connectors may be used to practice the present invention, the tapered dovetail connector 50 is the preferred type of connector. This is so because dovetail joints provide excellent resistance to imposed shear, tensile and compressive forces. For example, the dovetail joints of the preferred embodiment are designed to resist tensile and compressive forces of approximately 100,000 lbs. and shear forces of approximately 60,000 lbs. By use of the term "force resistant," Applicants mean that the tapered dovetail joint carries compressive forces along the faces 180 of the male and female dovetail members 62, 66, tensile forces along the overlapping portions of the dovetail taper 156 (Arrow A in FIG. 12), and shear forces along the dovetail taper 156 (Arrow B in FIG. 12). Also, while it is envisioned that any suitable dovetail taper 156 angles may be used in the dovetail connector 50, preferably the dovetail taper 156 has a side-to-side taper A (FIG. 13) of approximately 15° and a front to back angle B of approximately 45°. A 15° dovetail taper 156 is preferred because it has been determined that this angle permits the dovetail connector 50 to freely separate.

The crane boom segment 30 of the present invention is assembled by positioning the mating ends of the boom segment sections 42, 44 adjacent to one another, adjusting (if the two sections 42 and 44 have not previously been used together) the adjustable-length spacing member 86 at each dovetail connector 50 to insure that the spacing between the female dovetail members 66 of the top and bottom connectors is slightly smaller than the spacing between the male dovetail members 62, raising the segment section 44 having the female dovetail members 66 to a location above the male dovetail members 62 of the mating segment section 42, and lowering the female dovetail members 66 onto the male dovetail members 62 such that they engage one another along the dovetail tapers 156. The adjustable-length spacing members 86 are then adjusted so that both top and bottom connectors are aligned, thus aligning the lacing elements 38 of the two sections 42 and 44. At this point, locking bolts 152 are inserted into each dovetail connector 50 in the boom segment 30 to lock the dovetail members 62, 66 of each dovetail connector 50 in place.

Alternately, when connecting the dovetail members 62, 66, the male members 62 may be lowered to a position below that of the female members 66 and upwardly inserted into the female dovetail member 66 to form the dovetail connector 50.

The crane boom segment 30 may be disassembled into the segment sections 42 and 44 by a reverse sequence of the assembly method described directly above. Of course, the adjustment to the adjustable-length spacing members 86 need not be changed unless previously unmatched sections 42 and 44 are joined together.

Figure 15:
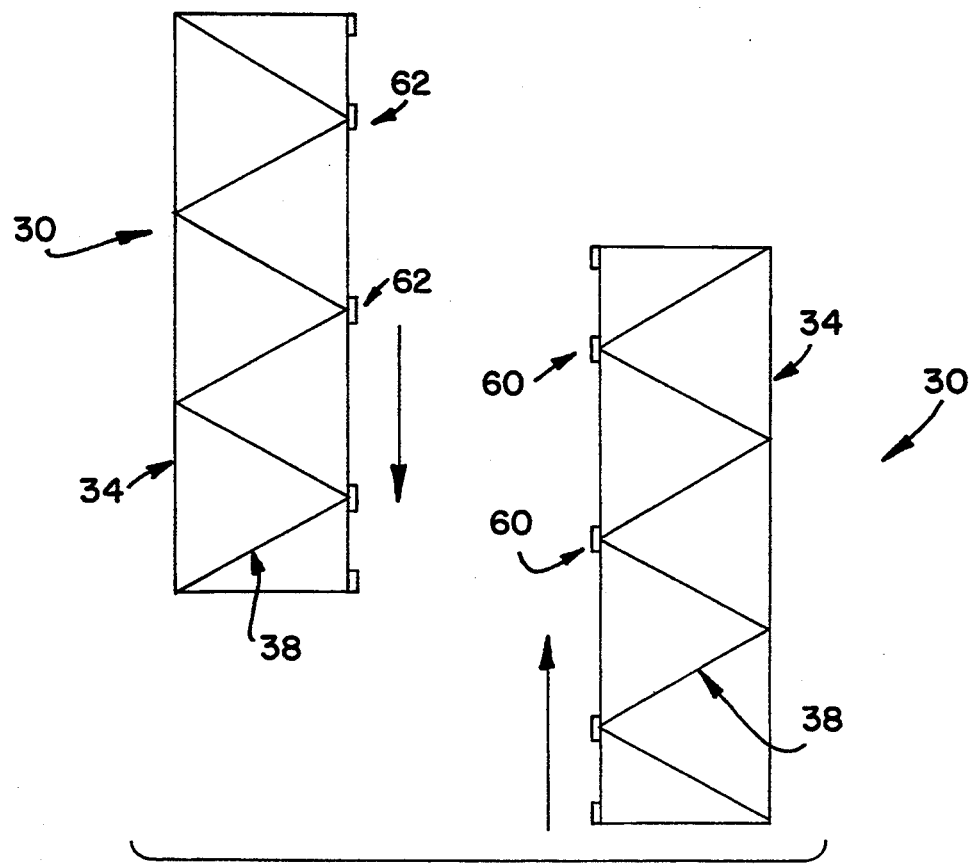
FIG. 15 is an elevational view of an alternate embodiment of one aspect of the present invention showing how individual self-supporting columns may be connected together by mating connectors to form a crane boom segment.

As shown in FIG. 15, in an alternate embodiment of one aspect of the present invention, individual crane boom sections 30, with at least three chord members 34 and lacing structures 38 connected to the chords 34 such that each section constitutes a self-supporting column, may be connected together to form a larger crane boom segment 30. In this embodiment, mating members 62, 66 of dovetail connectors may be positioned along mating faces of such boom segments that will be adjacent one another when the individual crane boom sections 30 are connected. As previously described, the boom sections may be aligned in the direction of the Arrows in FIG. 15 so that the mating members 62, 66 of the dovetail connectors may be connected.

Additionally, the dovetail connectors 50 of the present invention may be used as connectors for any suitable structural elements of a crane boom. For example, the dovetail connectors may be used as chord-to-chord connectors or to connect lacing members to chords.

Furthermore, although the crane boom segment 30 of the preferred embodiment of the present invention is longitudinally divisible in half, it is contemplated that the crane boom segment 30 may be divided along any longitudinal plane. For example, the crane boom segment 30 may be divided along both a vertical and horizontal plane.

The crane boom segment sections 42 and 44 are preferably fabricated in matched pairs by first making the connectors and attaching the lacing elements 37 and 38 thereto, and then welding the lacing elements onto chords 34 that are held by forms at the correct position.

The X-pattern lacing configuration shown in FIG. 2 has the advantage that, because of the geometry of the lacing elements, the only loads imposed on the X-pattern connections 58 are shear loads.

In a preferred embodiment, a crane boom 255 feet long and having a width of 18 feet 10 inches and a height of 12 feet 11 inches may be constructed. This large cross-section provides for a very efficient column strength, allowing the lifting of up to 800 metric tons, but is well beyond highway transport constraints. The segments of the boom are each divisible into sections 9 feet 5 inches wide (see "W" dimension in FIG. 4) and 12 feet 11 inches high, (see "H" dimension in FIG. 4) which will allow them to be transported over the highway.

In addition to being highway transportable, the preferred embodiment of the present invention has several other advantages. Few connectors are required to assemble the crane boom segment, making it simple and quick to assemble. Each connection is tight fitting, to prevent adverse effects in boom deflection. Minimal physical effort is required by personnel assembling or dismantling the crane boom at the lift site. There are few loose pieces of hardware to get lost between moves.

The overall system is easy to manufacture, and light weight compared to the size of load that can be lifted. The dovetail connections are supported by diagonal and vertical members. These provide torsional rigidity, as well as support for the dovetail joints when the sections 42 and 44 are separated for transport.

It should be appreciated that the crane boom segment 30 of this invention may be configured as appropriate for the application. The embodiments described above are to be considered in all respects only as illustrative and not restrictive. The scope of the invention is indicated by the following claims rather than by the foregoing description. All changes which come within the meaning and range of equivalency of the claims are to be embraced within their scope.

We claim:

1. A crane boom segment longitudinally divisible into a plurality of sections that are easily transportable, the sections each comprising:
    (a) at least two chord members;
    (b) a plurality of lacing elements permanently attached to and spacing said at least two chord members; and
    (c) a plurality of partial lacing elements, each partial lacing element comprising a first end permanently attached to one of said at least two chord members and a second end, the second ends of at least two partial lacing elements terminating in a frame member that is connected to a dovetail connector element, the dovetail connector element connectable to a dovetail connector element on one or more corresponding ends of a plurality of partial lacing elements attached to a chord member of another one of said plurality of sections.

2. The crane boom section of claim 1 wherein each segment comprises two chord members, and further comprises at least one lacing element permanently attached to and spacing said two chord members.

3. The crane boom segment of claim 1 further comprising at least one adjustable-length spacing member disposed between partial lacing elements on opposite sides of the section to facilitate alignment of those partial lacing elements with partial lacing elements of another section.

4. The crane boom segment of claim 3 wherein said at least one adjustable-length spacing member is adjustable by means of a turnbuckle assembly.

5. The crane boom segment of claim 1 wherein the dovetail connector elements of corresponding partial lacing elements connect to form a dovetail connector that is resistant to force selected from the group consisting of shear, tensile and compressive forces.

6. The crane boom segment of claim 5 wherein the dovetail connector is resistant to tensile and compressive forces of about 100,000 lbs and to shear forces of about 60,000 lbs.

7. The crane boom segment of claim 1 wherein each dovetail connector element comprises a tapered dovetail connector element.

8. The crane boom segment of claim 7 wherein the dovetail taper has an angle of approximately 15°.

9. The crane boom segment of claim 1 wherein the plurality of sections comprises two sections.

10. A crane boom segment longitudinally divisible into a plurality of sections that are easily transportable, the sections each comprising:
    (a) at least two chord members;
    (b) a plurality of lacing elements permanently attached to and spacing said chord members;
    (c) a plurality of partial lacing elements, each partial lacing element having a first end permanently attached to one of said at least two chord members and a second end connectable to one or more corresponding ends of a plurality of partial lacing elements attached to a chord member of the other section; and at least one of the sections further comprising:
    (d) at least one adjustable-length spacing member disposed between and connected to partial lacing elements on opposite sides of the section to facilitate alignment of those partial lacing elements with partial lacing elements of the other section.

11. The crane boom segment of claim 10 wherein the second end of each of the plurality of partial lacing elements is connectable to said one or more corresponding ends of said plurality of partial lacing elements attached to a chord member of said other section by mating connectors.

12. The crane boom segment of claim 11 wherein the mating connectors comprise dovetail connectors.

13. The crane boom segment of claim 11 wherein each mating connector is attached to two or more partial lacing elements.

14. The crane boom segment of claim 10 wherein said at least one adjustable-length spacing member is adjustable by means of a turnbuckle assembly.

15. A longitudinally divisible crane boom segment comprising a plurality of sections having mating dovetail connector elements positioned thereon, the mating dovetail connector elements comprising a locking connector capable of drawing and locking the mating dovetail connectors together and a plate having a V-shaped recess, said plate receiving said locking connector to prevent said locking connector from loosening, the mating dovetail connectors operable to connect said plurality of sections to form the crane boom segment.

16. The longitudinally divisible crane boom segment of claim 15 wherein each of said plurality of sections comprises:
(a) at least one chord member; and
(b) a plurality of partial lacing elements, each partial lacing element having a first end permanently attached to the chord member and a second end attached to one of said dovetail connector elements.

17. The longitudinally divisible crane boom segment of claim 15 wherein each of said plurality of sections has a height of not more than 12 feet 11 inches and width of not more than 9 feet 5 inches.

18. The longitudinally divisible crane boom segment of claim 15 wherein at least one of said plurality of sections further comprises at least one adjustable-length spacing member operative to facilitate alignment of the dovetail connectors so that said plurality of sections can be connected to form the crane boom segment.

19. A longitudinally divisible crane boom segment comprising a plurality of sections, at least one of said sections having at least one adjustable-length spacing member comprising a turnbuckle and a slidable turnbuckle sleeve, the turnbuckle sleeve operable to permit access to the turnbuckle to adjust the spacing member and having an inner surface configured to engage the turnbuckle to prevent the turnbuckle from turning once the spacing member is adjusted, the at least one adjustable-length spacing member operative to allow for the alignment of said plurality of sections so that said plurality of sections can be connected to form the crane boom segment.

20. The longitudinally divisible crane boom segment of claim 19 wherein each of said plurality of sections further comprises a plurality of mating connector elements operative to connect said plurality of sections to form the crane boom segment, 21. The longitudinally divisible crane boom segment of claim 20 wherein the plurality of mating connector elements comprise dovetail connector elements.

22. The longitudinally divisible crane boom segment of claim 19 wherein each of said plurality of sections has a height of not more than 12 feet 11 inches and a width of not more than 9 feet 5 inches.

23. A crane having a boom comprising a plurality of boom segments, at least one of the boom segments being longitudinally divisible into a plurality of sections, each of said sections comprising:
(a) at least one chord member;
(b) a plurality of partial lacing elements, each partial lacing element having a first end permanently attached to said at least one chord member and a second end, the second ends of at least two partial lacing elements terminating in a frame member; and
(c) a plurality of mating dovetail connectors, each mating connector attached to the frame member of the second ends of one or more partial lacing elements, wherein the mating connectors are connectable to one or more corresponding mating connectors connected to the ends of a plurality of partial lacing elements attached to a chord member of another one of the plurality of sections to form one of an X-pattern connection and a K-pattern connection.

24. A crane boom segment longitudinally divisible into a plurality of sections that are easily transportable, the sections each comprising:
(a) at least one chord member;
(b) a plurality of partial lacing elements, each partial lacing element having a first end permanently attached to said at least one chord member and a second end connectable to one or more corresponding ends of a plurality of partial lacing elements attached to a chord member of another one of said plurality of sections; and
(c) at least one adjustable-length spacing member disposed between and connected to partial lacing elements on opposite sides of the crane boom segment to facilitate alignment of those partial lacing elements with partial lacing elements of the other section, the spacing member comprising:
(i) a turnbuckle; and
(ii) a slidable turnbuckle sleeve, the turnbuckle sleeve operable to permit access to the turnbuckle to adjust the spacing member and to engage the turnbuckle to prevent the turnbuckle from turning once the spacing member is adjusted.

25. The crane boom segment of claim 1 wherein the locking connector comprises a bolt in one dovetail connector element and a threaded hole in a corresponding dovetail connector element.

26. The crane boom segment of claim 1 wherein the dovetail connector elements of corresponding partial lacing elements further comprise a jacking bolt which is capable of forcing the dovetail connector elements apart.

27. The longitudinally divisible crane boom segment of claim 15 wherein the locking connector comprises a bolt in one dovetail connector element and a threaded hole in a corresponding dovetail connector element.

28. The crane boom segment of claim 1 wherein the dovetail connector elements of corresponding partial lacing elements comprise a locking connector which is capable of drawing the dovetail connector elements together.

* * * * *

UNITED STATES PATENT AND TRADEMARK OFFICE
CERTIFICATE OF CORRECTION

PATENT NO. : 5,406,767
DATED : April 18, 1995
INVENTOR(S) : David J. Pech et al.

It is certified that error appears in the above-indentified patent and that said Letters Patent is hereby corrected as shown below:

In column 4, line 43, delete "comers" and substitute --corners--.

In column 6, line 8, delete "rigidities" and substitute --rigidifies--.

In column 6, line 9, delete "fight" and substitute --right--.

In column 6, line 21, delete "fight" and substitute --right--.

In column 7, last line, delete "fiat" and substitute --flat--.

In column 11, line 65,

In claim 20, line 5, delete "," and substitute --.--.

Signed and Sealed this

Ninth Day of January, 1996

Attest:

BRUCE LEHMAN

*Attesting Officer*     *Commissioner of Patents and Trademarks*